United States Patent Office 3,748,158
Patented July 24, 1973

3,748,158
REFRACTORY ALUMINOUS CEMENTS
Alexandru Iosif Braniski, Theodor D. Ionescu, and Nicoalae D. Deica, Bucharest, Rumania, assignors to Institutul de Cercetari Metalurgice, Bucharest, Rumania
No Drawing. Continuation-in-part of applications Ser. No. 24,029, Mar. 30, 1970, and Ser. No. 168,431, Aug. 2, 1971, which is a continuation of application Ser. No. 706,764, Feb. 20, 1968. This application Oct. 28, 1971, Ser. No. 193,581
Claims priority, application Rumania, July 3, 1967, 54,197; May 27, 1969, 60,093
The portion of the term of the patent subsequent to Feb. 27, 1990, has been disclaimed
Int. Cl. C04b 35/24, 35/44
U.S. Cl. 106—62                                7 Claims

ABSTRACT OF THE DISCLOSURE

A refractory aluminous cement containing 75 to 40% by weight calcium monoaluminate and/or calcium dialuminate and 20 to 55% by weight of spinel $$(MgO \cdot Al_2O_3).$$

CROSS-REFERENCE TO RELATED APPLICATIONS

The present application is a continuation-in-part of application Ser. No. 24,029, filed Mar. 30, 1970 (now abandoned) and of application Ser. No. 168,431, filed Aug. 2, 1971 as a continuation of then pending application Ser. No. 706,764, filed Feb. 20, 1968 (also abandoned).

FIELD OF THE INVENTION

Our present invention relates to refractory aluminous cements and, more particularly, to cement compositions which are basically hydraulic cements but have a refractoriness or heat resistance which surpasses that of nonrefractory cements and approaches the heat resistance of nonhydraulic refractory compositions.

The invention also relates to a method of making refractory aluminous cements and products formed by using them.

BACKGROUND OF THE INVENTION

Conventional hydraulic cements such as portland cement and iron-containing aluminous cements, e.g. blast-furnace cement or ferrocement, have been proposed heretofore for numerous applications but are only incompletely satisfactory for refractory applications, i.e. in the production of concrete which must be resistant to high temperatures or subjected to large quantities of thermal energy. The term "refractory cements" is used herein to refer to cements which are adapted to produce concrete by processes well known for hydraulic cements, the product being resistant to temperatures in excess of 1500° C. in the sense that there is negligible loss of compressive strength, little spalling and substantially no internal-stress cracking even when the concrete product is exposed to such temperatures for long periods.

It has been a general practice to produce refractory concretes with these properties from refractory cements consisting primarily of calcium and/or barium oxides, refractory aggregates, and alumina. These cements, which are substantially free from iron oxide and fluxing agents such as silica, sodium oxide, potassium oxide and the like, consist almost exclusively of calcium monoaluminate ($CaO \cdot Al_2O_3$), calcium dialuminate ($CaO \cdot 2Al_2O_3$) or barium aluminate with the least possible amount of impurities.

Refractory calcium aluminate cements have been proposed which consist of calcium monoaluminate or calcium dialuminate and are obtained from calcitic limestone, practically free from magnesia, and from calcined alumina, the magnesia content of the product being less than 2% by weight. Higher magnesia contents have been avoided in these systems because magnesia has been recognized as a fluxing agent which would be expected, in the presence of water, to cause hydration capable of weakening concrete and mortar made from such cements. Thus, dolomite and dolomitic limestone have been scrupulously avoided in the formation of calcium aluminate cements of the prior art.

We should also acknowledge that various studies have been made of systems in which calcium oxide, alumina and magnesia are present jointly, with the goal of determining the refractoriness of the compositions which preliminarily are intended to form linings, walls and beads for metallurgic furnaces. Invariably, these mixtures are used as a packed, tamped and fired mass and are not employed in the production of concrete or as hydraulic cements. In fact, most compositions of these three components are totally unusable as hydraulic cements, cannot form practical concretes or mortars with refractory or nonrefractory aggregates and cannot even be tested by any practical means against hydraulic cements for compressive strength, prolonged resistance to elevated temperatures or the like, since they simply are neither cement nor hydraulic binders.

We might mention further that the simple addition of magnesia in amounts up to 5% of a cement composition consisting otherwise of calcium monoaluminate $$(CaO \cdot Al_2O_3)$$

and/or calcium dialuminate ($CaO \cdot 2Al_2O_3$) merely points up the general prior belief that magnesia (MgO) tends to act as a hydratable fluxing agent detrimental to the binder and refractory characteristics of such cements.

OBJECTS OF THE INVENTION

It is the principal object of the present invention to provide an improved refractory aluminous cement whereby the aforementioned disadvantages can be avoided.

Still another object of the invention is to provide an improved method of making a refractory aluminous cement.

Still another object resides in the production of an improved cement-containing body which is resistant to heat.

SUMMARY OF THE INVENTION

These objects and others which will become apparent hereinafter are attained, in accordance with the present invention, by a refractory cement composition consisting of a hydraulic component in the form of 75 to 40% by weight of calcium monoaluminate ($CaO \cdot Al_2O_3$) or calcium dialuminate ($CaO \cdot 2Al_2O_3$) or a combination of both, and 20 to 55% by weight of magnesium oxide-alumina spinel ($MgO \cdot Al_2O_3$), the latter being a nonhydraulic constituent which, surprisingly, does not destroy the binder characteristics of the composition in the indicated proportions and in fact constitutes a superrefractory. Preferably, the cement consists of 75 to 50% by weight of calcium aluminate (i.e. the monoaluminate or dialuminate or both) and 25 to 45% by weight of spinel ($MgO \cdot Al_2O_3$). While the above proportions allow 5% or more of other substances, e.g. iron oxide, silica and like constituents of earlier cements, we prefer that the cement should consist entirely of the calcium aluminate and the spinel.

It has already been pointed out that the fact that the composition is satisfactory as a hydraulically activatable refractory cement derives, on the one hand, from the general belief that magnesia interferes with the binder properties of the cement without contributing significantly to the refractory characteristics. In fact, it appears that when the magnesia is properly proportioned to the extent indicated in the cement, it remains in the form of a spinel which is even more refractory than the other constituents of the cement and has the advantage that it is not hydratable. Preferably, the magnesia derives from dolomitic limestone which is to be found in a substantially pure state in abundance.

According to a further feature of the invention, the cement is sintered from its components, i.e. calcium oxide (CaO), alumina ($Al_2O_3$) and magnesia (MgO) or double compounds such as $CaO \cdot Al_2O_3$, $CaO_2Al_2O_3$, $MgO \cdot Al_2O_3$, at a temperature between 1450° and 1650° C., or are formed by melting the oxides, the double compounds or other compositions yielding the oxides at a temperature within this range. The term "sintering" is used herein to refer also to a simple calcination or firing of the composition.

The refractory cements of the present invention thus contain magnesium compounds, especially magnesium oxide, in the form of spinel ($MgO \cdot Al_2O_3$) in an amount ranging between 20 and 55% by weight of the composition and preferably between 25 and 45% by weight thereof. The spinel is not, however, obtained from calcitic limestone but results, in accordance with the present invention, from the formation of a homogeneous admixture of finely powdered dolomite and calcined aluminate, the mixture being fired at 1530° to 1650° C. to effect sintering or melting in the preferred case. Advantageously, the cement may be made from a composition consisting of 30 to 50% by weight of dolomite and 70 to 50% by weight calcined alumina, the firing, mixing and comminution being carried out in apparatus such as has been used for prior-art calcium-aluminous cements. The burning of the cement clinker may be carried out at the same temperatures as have been used heretofore for calcium aluminous cements of the prior art although decarbonization of dolomite begins at a somewhat lower temperature than that of calcitic limestone.

In mixtures according to the present invention, containing small proportions of dolomite and large proportions of calcined alumina, the sintering process appears to form primarily the calcium dialuminate ($CaO \cdot 2Al_2O_3$) along with the spinel ($MgO \cdot Al_2O_3$) and some calcium hexaluminate ($CaO \cdot 6Al_2O_3$). Both the spinel and the calcium hexaluminate contribute substantially to the refractory character of the cement while, as noted above, the calcium dialuminate contributes significantly to the hydraulic-binder character with which neither the spinel nor the calcium hexaluminate appears to interfere. Refractory cements of this composition have melting points above 1770° C.

When the composition, according to the present invention, contains relatively large proportions of dolomite and relatively small proportions of calcined alumina, the sintering step produces primarily calcium monoaluminate ($CaO \cdot Al_2O_3$) and spinel ($MgO \cdot Al_2O_3$) constituting hydraulic and refractory constituents with a lower melting point which, however, is above 1600° C.

With mixtures of intermediate proportions, e.g. wherein the composition contains about 40% dolomite and 60% calcined alumina (by weight), both calcium monoaluminate ($CaO \cdot Al_2O_3$) and calcium dialuminate ($CaO \cdot 2Al_2O_3$) as hydraulic constituents, together with spinel ($Mg \cdot Al_2O_3$) as a refractory constituent are formed. The cement has a melting point above 1690° C.

The present invention also extends the principles of the parent applications by providing that, to obtain the same refractory aluminous cement clinkers, instead of dolomite: from mixtures of dolomite limestone or any other natural or artificial raw materials with a magnesium content as: magnesia, magnesium hydroxide (hydrated magnesia), magnesium carbonate or magnesium sulfate, mixed with natural or artificial raw materials containing calcium, as: lime, calcium hydroxide (hydrated lime), limestone, calcium carbonate or calcium sulfate, in correspondent stoichiometrical proportions, the calcined alumina being, in all or in part, substituted by unburned alumina, hydrated alumina, natural hydrated alumina, or by any other kind of natural or artificial raw materials, hydrated or unhydrated, containing alumina $Al_2O_3$, as: bauxite, calcined bauxite, boehmite, hydraargillite, bayerite and corundum, may be used in corresponding stoichiometrical proportions.

SPECIFIC EXAMPLES

Example I 9.5% by weight magnesia, 23.5% by weight limestone and 67.0% by weight calcined alumina, are fineground and mixed to make them homogeneous. The raw materials have the following compositions (all by weight):

Magnesia: 0.55% $SiO_2$, 0.87% $Al_2O_3$, 0.60% $Fe_2O_3$, 2.15% CaO, 95.83% MgO, together 100%.

Limestone: 0.32% $SiO_2$, 0.14% $Al_2O_3$, 0.11% $Fe_2O_3$, 54.63% CaO, 0.20% MgO, 44.20 loss on ignition, together 99.60%.

Calcined alumina: 0.04% $SiO_2$, 98.2% $Al_2O_3$, 0.2% $Fe_2O_3$, 0.3% CaO, 0.7% MgO, 0.62% $Na_2O+K_2O$, together 100.06%.

The above-mentioned mixture is burned in a conventional cement kiln until sintering (1580° C.). After slow cooling, the resulting clinker is ground at the portland cement fineness.

The resulting refractory calcium and magnesium aluminous cement is an hydraulic binder with normal setting and rapid hardening. Its refractoriness is 1770° C., its compressive strength after 3 days 412 kg./cm.² and after 7 days 506 kg./cm.².

The *mineralogical composition* (by weight) of the new refractory cement is 34.3% spinel $MgO \cdot Al_2O_3$ (melting point 2135° C.) super-refractory constituent; 62.7% calcium dialuminate $CaO \cdot 2Al_2O_3$ (melting point 1750° C.) hydraulic constituent; 1.5% calcium monoaluminate $CaO \cdot Al_2O_3$ (melting point 1600° C.) hydraulic constituent; 0.7% brownmillerite $4CaO \cdot Al_2O_3 \cdot Fe_2O_3$ (melting point 1415° C.) secondary hydraulic constituent and 0.8% gehlenite $2CaO \cdot Al_2O_3$—$SiO_2$ (melting point 1590° C.) secondary non-hydraulic constituent.

*The refractory concrete* resulting from 20% refractory calcium and magnesium aluminous cement and 80% refractory magnesite grog, with 16% <0.2 mm., 32% 0.5 to 2 mm. and 32% 2 to 5 mm. φ grading, has the refractoriness of 1960° C. (S.K. 41/42).

Example II 47.4% of dolomite and 52.6% of calcined alumina are very finely ground, then admixed and homogenized. The raw materials have the following chemical composition:

Dolomite: $SiO_2$ 0.69%; $Al_2O_3$ 0.73%; $Fe_2O_3$ 0.55%; CaO 29.43%; MgO 21.46%; $Na_2O+K_2O$ 0.21%; loss of ignition 46.54%.

Calcined alumina: $SiO_2$ 0.04%; $Al_2O_3$ 98.2%; $Fe_2O_3$ 0.2%; CaO 0.3%; MgO 0.7%; $Na_2O+K_2O$ 0.62%.

The above mixture is fired up to sintering or melting (1530° to 1630° C.) in a usual cement furnace. After slow cooling, the resulting clinker is ground as finely as a portland cement.

The refractory calcium and magnesium aluminous cement obtained is a hydraulic bonding agent (it is not disaggregated under water). It has a normal set, a rapid hardening and a refractoriness of 1630° C. It has a compressive strength of 358 kgf./cm.² after 3 days, and of 507 kgf./cm.² after 28 days.

The basic hydraulic constituent of this new refractory cement is the calcium monoaluminate, and its refractory constituent spinel.

The refractory concrete prepared from 20% of the above refractory calcium and magnesium aluminous cement and 80% of white electrocast corundum as refractory aggregate, having 16% of the granules of φ<0.2 mm., 32% between 0.5 and 2 mm., and 32% between 2 and 5 mm., has a refractoriness of 1865° C.

Example III

As shown in the preceding example, but starting from 43% of dolomite and 57% of calcined alumina, a refractory calcium and magnesium aluminous cement is obtained, whose basic hydraulic constituents are calcium monoaluminate and calcium dialuminate, and the refractory constituent spinel. Its setting is normal too, the hardening rapid and the refractoriness 1690° C. It has a compressive strength of 396 kgf./cm.$^2$ after 3 days, and of 498 kgf./cm.$^2$ after 28 days.

The refractory concrete prepared from 20% of the cement and 80% of chrome-magnesite as refractory aggregate, with the same granulation as in the preceding example, has a refractoriness of 1920° C.

Example IV

As shown in the preceding examples but starting from 37.6% of dolomite and 62.4% of calcined alumina, a refractory cement is obtained, whose basic hydraulic constituent is calcium dialuminate and the refractory constituent spinel.

The setting of this cement is not rapid but normal, while its hardening is rapid and its refractoriness 1770° C. It has a compressive strength of 432 kgf./cm.$^2$ after 3 days, and of 571 kgf./cm.$^2$ after 28 days.

The refractory cement made from 20% of the cement and 80% of magnesite as refractory aggregate, with the same granulation as in the preceding examples, has a refractoriness of 1960° C.

As compared with the refractory calcium aluminous cements commercially known, on the basis of calcium dialuminate and calcium monoaluminate, obtained from limestone and calcined alumina, the refractory calcium and magnesium aluminous cements, obtained from dolomite and calcined alumina, and which form the subject of the present invention, offer at the same cost price the following advantages:

(1) They are more refractory, due to the spinel, $MgO \cdot Al_2O_3$ content, which is a highly refractory constituent with melting point 2135° C.

(2) They hydrate (set and harden) with less water, this resulting in a reduced porosity after hardening, and in lesser contraction on firing.

(3) They lose after hardening less of their initial mechanical strength (compressive and tensile strengths) during dehydration, caused by firing up to 1100° C., and before ceramic strengthening, which is affected above this temperature.

We claim:

1. A refractory calcium-magnesium-aluminum cement consisting essentially of 40 to 75% by weight of a hydraulic component of calcium monoaluminate $$(CaO \cdot Al_2O_3)$$

and/or calcium dialuminate $(CaO \cdot 2Al_2O_3)$, and 20 to 55% by weight of spinel $(MgO \cdot Al_2O_3)$ as a refractory constituent fired at a temperature of 1450° to 1650° C.

2. The cement defined in claim 1 which consists of 50% to 75% by weight of calcium monoaluminate and/or calcium dialuminate and 25 to 45% by weight of spinel.

3. The cement defined in claim 2 which is burned essentially from a mixture of 30 to 50% dolomite by weight and 70 to 50% calcined alumina by weight, heated to a temperature of 1450° to 1650° C.

4. The cement defined in claim 3 having been fired to a temperature between 1530° and 1650° C., slowly cooled and finely ground.

5. The cement defined in claim 3 wherein the mixture has been fired at 1450° to 1530° C.

6. A refractory concrete consisting of a refractory aggregate and the hydraulically activated cement defined in claim 1.

7. The cement defined in claim 1, consisting essentially of 34 to 42% by weight of $MgO \cdot Al_2O_3$, about 63 to 6.9% by weight $CaO \cdot 2Al_2O_3$ and about 36.5% to 1.5% by weight of $CaO \cdot Al_2O_3$.

References Cited

UNITED STATES PATENTS 3,303,037  2/1967  Klein _____ 106—104

OTHER REFERENCES

Levin et al.: Phase Diagrams for Ceramists, The American Ceramic Society, Columbus, Ohio, 1964, p. 209.

Lea and Desilr: "The Chemistry of Cement and Concrete," Edward Arnold and Sons, pp. 34–35, 459–460 (1956).

DELBERT E. GANTZ, Primary Examiner

S. BERGER, Assistant Examiner

U.S. Cl. X.R.

106—104

PO-1050
(5/69)

UNITED STATES PATENT OFFICE
CERTIFICATE OF CORRECTION

Patent No. __3,748,158__          Dated __24 July 1973__

Inventor(s) __Alexandru Iosif BRANISKI ET AL__

It is certified that error appears in the above-identified patent and that said Letters Patent are hereby corrected as shown below:

Claim 1 lines 27 and 28 should read:

--Application Ser. No. 24,029, filed 30 March 1970 and of now abandoned Application Ser. No. 168,431, filed.--

Signed and sealed this 12th day of March 1974.

(SEAL)
Attest:

EDWARD M. FLETCHER, JR.  
Attesting Officer

C. MARSHALL DANN  
Commissioner of Patents